United States Patent
Bao et al.

(10) Patent No.: US 10,009,406 B2
(45) Date of Patent: Jun. 26, 2018

(54) INCENTIVIZED SHARING FOR TOLL-FREE DATA

(71) Applicant: Verizon Patent and Licensing Inc., Arlington, VA (US)

(72) Inventors: Guanqun Bao, Sunnyvale, CA (US); Manish Sharma, San Jose, CA (US); Kevin Flores, San Jose, CA (US); Tushar Chaudhary, Mountain View, CA (US); Gaurav Gupta, San Jose, CA (US); Devin Blong, Penngrove, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 327 days.

(21) Appl. No.: 14/616,792

(22) Filed: Feb. 9, 2015

(65) Prior Publication Data

US 2016/0234284 A1    Aug. 11, 2016

(51) Int. Cl.
*G06F 15/16* (2006.01)
*H04L 29/08* (2006.01)
*G06F 17/30* (2006.01)

(52) U.S. Cl.
CPC ........ *H04L 67/02* (2013.01); *G06F 17/30861* (2013.01); *H04L 67/327* (2013.01)

(58) Field of Classification Search
CPC .. H04L 67/02; H04L 67/327; G06F 17/30861
See application file for complete search history.

(56) References Cited

U.S. PATENT DOCUMENTS

| | | | | |
|---|---|---|---|---|
| 6,112,239 A | * | 8/2000 | Kenner | H04L 67/1008 709/223 |
| 2011/0055413 A1 | * | 3/2011 | Lobsenz | G06Q 10/06 709/231 |
| 2014/0120867 A1 | * | 5/2014 | Hodges | G06Q 30/00 455/406 |
| 2015/0135337 A1 | * | 5/2015 | Fushman | H04L 67/22 726/30 |
| 2016/0021201 A1 | * | 1/2016 | Chen | G06F 17/30876 709/224 |

* cited by examiner

*Primary Examiner* — Michael A Keller

(57) ABSTRACT

A network device provides, to a user device, an application for managing viewing and sharing of content available via an Internet service provider, and assigns a unique code for a user of the user device. The network device provides a catalog of available content items that includes toll-free data (TFD) content items with a different TFD uniform resource locator (URL) for each TFD content item in the catalog of available content items. The network device receives a user's selection, from the catalog, of a TFD content item to share, and generates a sharing URL based on a TFD URL for the selected TFD content item and the unique sharing code. The network device provides the sharing URL to the user device for sharing with other users.

20 Claims, 12 Drawing Sheets

INCENTIVIZED SHARING FOR TOLL-FREE DATA

BACKGROUND

Wireless data plans allow mobile subscribers to access content and/or applications ("apps") through mobile devices. Data usage for end users is typically charged to an account associated with each end user. The end user account may have a periodic limit on total data usage, for example on wireless networks (e.g., a 2 Gigabyte per month data plan). End users on networks that have periodic limits for data usage often arrange their data usage behavior to avoid overages associated with periodic limits on data usage. For example, an end user may curtail online shopping or other activity when they are approaching or have exceeded the periodic limit.

DETAILED DESCRIPTION OF PREFERRED EMBODIMENTS

The following detailed description refers to the accompanying drawings. The same reference numbers in different drawings may identify the same or similar elements.

Toll-Free Data (TFD) service allows mobile subscribers to access content without impacting their monthly wireless data plan. Websites or mobile apps registered as toll free content will be free for the consumers, and data charges can be billed directly to the sponsoring company instead of the consumer's personal account. As a result, the consumers can reduce the data consumption billed to their mobile accounts, and the content providers, website, and/or mobile app companies can increase their digital presence and potentially increase their product sales. Thus, TFD service offers a data consumption model that can benefit consumers, sponsoring companies, and even network service providers. However, there remain challenges in how to make the consumers aware of this service and engaged with it. Social network platforms (e.g., Facebook®, Twitter®, etc.) are helpful platforms in developing brand awareness for TFD services because they serve as forums where consumers discuss and share their contents of interest with their friends.

According to an implementation described herein, an incentivized sharing system is provided to motivate users to share TFD content (e.g., content sponsored by a content provider or Internet service provider so that users can access content without impacting a data plan) on their social networks and to increase the visibility of TFD services. A consumer that shares TFD content (referred to herein as a "TFD sharer") can earn points applicable to a rewards program by sharing TFD content with his/her friends through forums, blogs, social networks, etc. A consumer that accesses TFD content via a TFD sharer (referred to herein as a "TFD recipient") receives access toll free content without accruing data charges and triggers a credit for the TFD sharer's account.

TFD content may also be used by service providers to incentivize user behavior. For example, TFD content (also referred to individually as a "TFD content item") may provide incentives for users to alter their content consumption patterns. In one implementation, a TFD service may provide an incentive for a user to consume heavier (more bandwidth intensive) content at non-peak periods, instead of peak usage periods. The service provider may designate a particular content item (e.g., content that a user has already selected to consume) as a TFD content item for the user, if the user agrees to postpone consuming the particular content to a non-peak period.

As used herein, the term "user" is intended to be broadly interpreted to include a user device or a user of a user device. Also, the term "user," "consumer," and "subscriber" may be used interchangeably.

Figure 1:
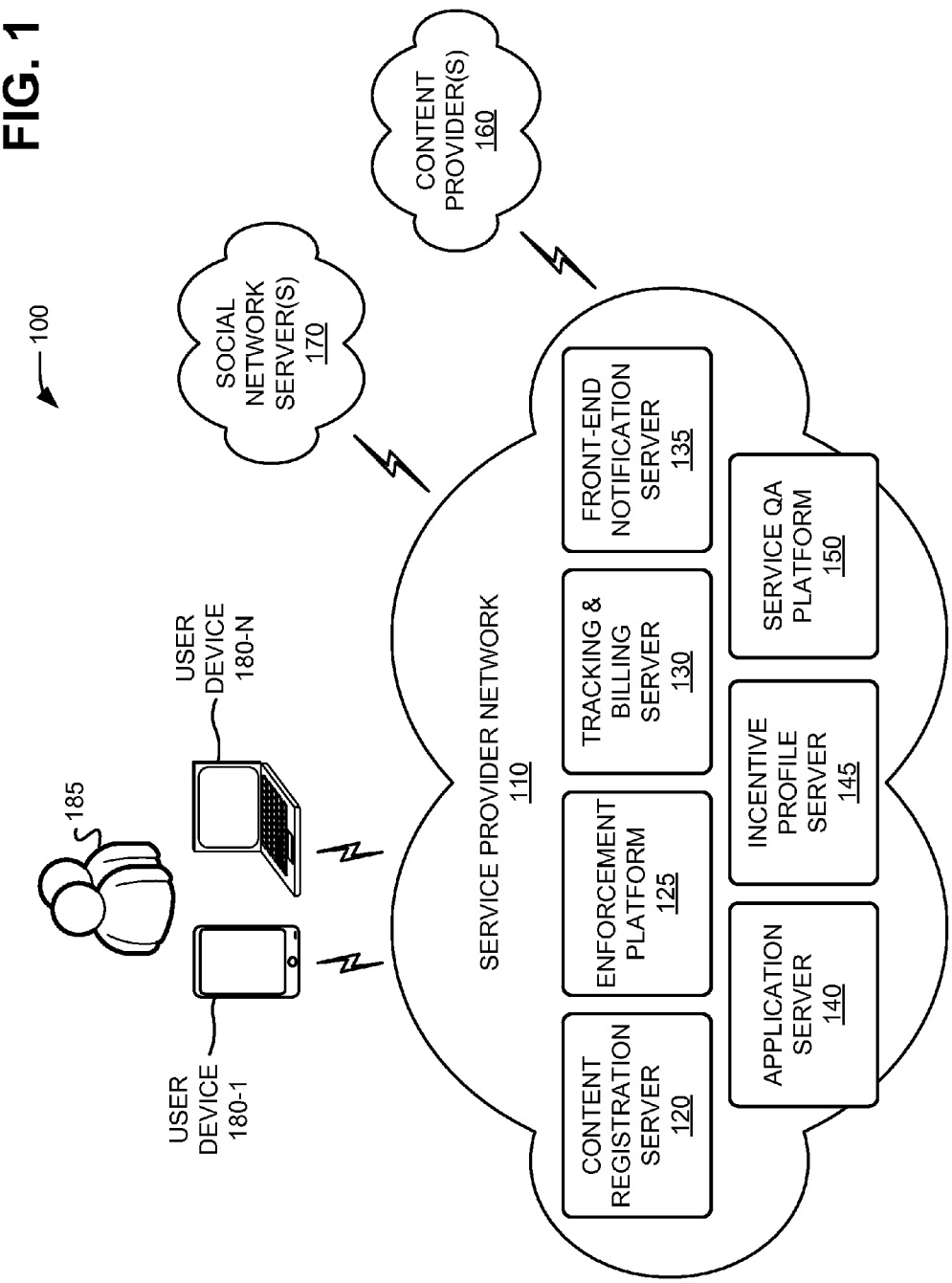
FIG. 1 is an exemplary network environment in which systems and/or methods described herein may be implemented.

FIG. 1 is an exemplary network environment 100 in which systems and/or methods described herein may be implemented. As illustrated, network environment 100 may include a service provider network 110 including an enforcement platform 125, a tracking and billing server 130, a front-end notification server 135, an application server 140, an incentive profile server 145, and a service quality assurance (QA) platform 150; one or more content providers 160; one or more social network servers 170; and user devices 180-1 through 180-N (collectively "user devices 180" and individually "user device 180") accessed by users 185.

Service provider network 110 may include one or more wired, wireless and/or optical networks that are capable of receiving and transmitting data, voice and/or video signals, including multi-media signals that may include voice, data and video information. For example, network 110 may include one or more public switched telephone networks (PSTNs) or other type of switched network. Network 110 may also include one or more wireless networks and may include a number of transmission towers for receiving wireless signals and forwarding the wireless signals toward the intended destinations. Network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

Service provider network 110 may provide, among other services, access to digital content, such as web pages, downloads, or streaming media available to user devices 180. In an exemplary implementation, service provider network 110 may represent a network associated with a service provider that provides various services, such as Internet-protocol (IP) related services, value added services, etc. For example, in one implementation, service provider network 110 may represent an Internet-protocol Multimedia Subsystem (IMS) network that provides services to IMS subscribers.

Service provider network 110 may monitor data consumption by user devices 180 over all or portions of service provider network 110. In some instances, service provider network 180 may manage accounts with limited data quotas over some or all of network environment 100. For example, a single user device 180 may be registered with a mobile data plan that includes a one (1) GB per month limit, with charges incurred by the user for additional data use over the monthly limit. As another example, a home account with an Internet service provider (ISP) may be accessible by multiple user devices 180 and may include a cumulate 250 GB data limit per month, with charges incurred for additional data use over the monthly limit. According to implementations described herein, some content from the content providers may be marked as TFD content that is provided to user device 180 without being credited toward a user's monthly data limit and/or accruing data use charges.

Content registration server 120 allows content providers 160 to register billing accounts and particular content for TFD services. Content registration server 120 may be a network device or server (or application server, group of servers, etc.) which allows a content provider customer to register toll-free portions (or data consuming portions) of associated applications or websites with a service provider for network 110. For example, a content provider 160 may register content, which is designated to be toll-free to the user, at a particular uniform resource locator (URL) or an application identifier (ID) for a particular application (collectively referred to herein as "TFD URL"). Content registration server 120 may provide a content provider customer based portal where content provider 160 (e.g., a third party entity) may create an account (or identify an existing account with the service provider), register and add their application or specific page to a database of identifiers for data toll free components. The content provider 160 may apply specific classes to items they want to make toll-free for end users (e.g., user devices 180).

Enforcement platform 125 may be a network device or server (or application server, group of servers, etc.) that allows end users to use data with no charges for content associated with particular content provider customers via network 105 (i.e., the content is data toll free from the user's perspective). Enforcement platform 125 may allow tracking of data usage in association with content consumption by end users in association with particular content provider customers. Enforcement platform 125 may provide information to billing server 130 that allows TFD content providers to pay for consumers (i.e., end users 185 associated with user devices 180) to look at their websites or use their applications.

Enforcement platform 125 may, for example, identify TFD content by performing packet inspections and extracting a snippet identifier from a content flow. As described further herein, the snippet identifier may be assigned as part of a content provider's registration process with content registration server 120. Enforcement platform 125 may also provide a tracking mechanism to monitor usage of TFD resources by users. For example, enforcement platform 125 perform network-based authentication to identify subscribers. In one implementation, enforcement platform may insert a subscriber identifier into TCP/IP packets to represent the mobile identity of a mobile user.

Tracking and billing server 130 may be a network device or server (or application server, group of servers, etc.) that manages crediting TFD sharers for use (i.e., by TFD recipients) of links to TFD resources and charging the appropriate entity (e.g., content providers 160) for services provided via network 110. In one implementation, tracking and billing server 130 may monitor data consumption and a number of clicks to a particular URL (e.g., a TFD URL or a sharing URL, as described below). In some implementations, billing services may be performed by servers external to network 110 (e.g., billing servers for a partner entity or third party entity). Tracking and billing server 130 may receive instructions and/or information from content registration server 120 indicating an account, associated with a content provider 160, to which charges for data consumed by an end user device 180 are to be applied.

Front-end notification server 135 may be a network device or server (or application server, group of servers, etc.) that provides notifications to enable a user to differentiate consumption of toll-free content from regular content. The notifications from front-end notification server 135 may be provided to user device 180 and presented, for example, as on-screen indications of TFD usage on user device 180. Notifications may include, for example, pre-use notifications to differentiate links to TFD content from links to regular content, entry notifications to indicate when a user is entering a website or other service with a toll-free experience, and concurrent notifications to indicate a TFD environment while a user is accessing a website or service. Other notifications formats, such as color codes or audible tones, may also be used.

Application server 140 may include one or more network devices, or other types of computation or communication devices, to provide a backend support system for mobile applications residing on user devices 180. For example, application server 140 may permit user devices 180 to download a client application that may permit a user to find and/or access TFD content of interest. The client application may enable user devices 180 to present, to a user 185 of user device 180, information received from network 110 (e.g., content registration server 120) in an interactive format to allow selection of particular TFD content. For example, application server 140 may provide an interactive catalog of TFD content. Additionally, or alternatively, application server 140 may provide content metadata, such as lists or categories of TFD content. Also, application server 140 may authenticate a user device 180 or user 185 to view and/or share TFD content. In one implementation, the interactions between application server 140 and user device 180 may be performed using hypertext transfer protocol (HTTP) or secure HTTP (HTTPS). According to implementations described herein, application server 140 may generate a unique short URL for TFD content shared by a particular user (referred to herein as a "sharing URL"). The sharing URL may be used (e.g., by tracking and billing server 130) to track when TFD recipients access TFD content from a TFD sharer.

Incentive profile server 145 may store user profile information for users (e.g., users of user devices 180). The user profile information may include various information regarding a user, such as login information (e.g., a user identifier and a password), types of services to which the user has subscribed, a user device identifier (e.g., a mobile device number (MDN), a media player identifier, a mobile device identifier, a set top box identifier, a personal computer identifier) for user device 180, a subscriber identifier, or the like. Incentive profile server 145 may also log use of sharing URLs associated with a particular user. For example, profile server 145 may monitor the number of unique TFD recipients that access a sharing URL. In one implementation, profile server 145 may also track secondary sharing, such as when a first sharing URL is shared by one of the TFD recipients. In another implementation, incentive profile server 145 may log accepted delay incentives based on a user's election to postpone consumption of selected content during peak network service periods. Incentive profile server 145 may apply the sharing URL log and or delay incentives to a rewards account. The rewards account may include, for example, a points-based system that may be used to accrue additional data (e.g., for a mobile data plan), that may apply additional data to another account (e.g., charity), or integrated into a rewards program.

Service QA platform 150 may include one or more network devices, or other types of computation or communication devices, to determine if current network conditions are sufficient to support high-quality data transfer for a user's selected content before initiating streaming, downloading, etc. For example, service QA platform 150 may function as an in-line network component to evaluate service conditions. Service QA platform 150 may recommend postponing (e.g., time-shifting) consumption when network conditions are not adequate for a high-quality user experience, and may communicate with incentive profile server 145 to manage incentive reward options when a user agrees to postpone consumption.

Content provider system 160 may collect, generate, and provide data consuming content that may be accessed by subscribers of network 110 via user devices 180. Data consuming content may include, for example, web pages, applications, encoded video content in any of a variety of formats, including, for example, Multiview Video Coding (MVC), Moving Picture Experts Group (MPEG)-2 TS, etc. Content provider system 160 may provide media content to a mobile user device 180 or a user device connected to a customer premises network. Additionally, content provider system 160 may interface with registration server 120 to register items that content provider 160 wants to make toll-free for end users. Examples of TFD content may include (without limitation) website content, movie trailers, mobile app downloads, sample music tracks, product catalogs, etc.

Social network server(s) 170 may include one or more network devices that implement social network services (e.g., Twitter, Facebook, LinkedIn, etc.). Social network server 170 may maintain social network accounts, including social networking data, for users 185. Social network servers 170 may provide a platform for a TFD sharer to share (or post) a sharing URL that may be accessed by other users (e.g., friends, contacts, etc. of the TFD sharer in the social network).

User device 180 (referred to singularly as "user device 180," in plural as "user devices 180" or generally as "user devices 180") may include any type of device that is able to transmit and receive data, such as text data, video data, image data, audio data, multi-media data, etc. For example, user devices 180 may include some type of computer (e.g., as a personal computer (PC), a tablet computer, a laptop computer, a wearable computer, etc.), a personal digital assistant (PDA), a web-based appliance, a mobile terminal (e.g., a cellular telephone, smart watch, or the like), etc. User devices 180 may also include a telephone, such as an Internet-protocol (IP) based phone, a wireless telephone, etc., used to make and receive telephone calls. User device 180 may be a subscriber to telephony services and/or data usage services provided in association with network 110. Data usage services may include any activity that consumes data and may be implemented, for example, in conjunction with or as a consequence of, user device 180 sending or receiving data from accessing websites, applications, etc.

Each user device 180 may be associated with one or more particular customer accounts for end user customers of the service provider that operates network 110. According to implementations described herein, user device 180 may be equipped with a client application that provides a central point for a subscribing user to discover all TFD content (i.e., content that does not count toward a subscriber's data plan usage) and share links to certain TFD content. In another implementation, the client application may also allow users to select other content options (such as any TFD or non-TFD content) and communicate with service provider network 110 (e.g., service QA platform 150) to recommend delayed content consumption when network conditions are not adequate to provide a high-quality user experience. When network conditions are not adequate to provide a high-quality user experience, the client application may present incentives and manage time-shifting when a user agrees to delayed content consumption.

According to implementations described herein, content providers 160 may register with service provider network 110 (e.g., via content registration server 120) to associate particular toll-free content with TFD URLs. A TFD sharer (e.g., user 185) using user device 180-1 may use a client application to access a catalog of TFD content (e.g., from application server 140) and select a particular content item to share on a social network. Service provider network 110 may assign a unique sharing URL that associates the TFD sharer and the TFD URL for the selected content. The TFD sharer, using user device 180-1, may share the sharing URL via social network server 170. TFD recipients (e.g., other users 185 using user devices 180-N) may access the particular content item via the sharing URL. Service provider network 110 may log use of the sharing URL, provide the TFD recipient access to the toll-free content, register a credit the TFD sharer, and bill the content provider for the data use.

According to another implementation described herein, service provider network 110 (e.g., service QA platform 150) may monitor network congestion status (e.g., of service provider network 110) at the time of a content request and provide delayed consumption incentives to the user, when applicable. The client application on user device 180 may enable the user device to apply incentives and re-schedule consumption of postponed content. In some implementations, incentives for postponing consumption may include toll-free access, at a future time, to at least a portion of the selected content.

In FIG. 1, the particular arrangement and number of components of network environment 100 are illustrated for simplicity. In practice there may be more service provider networks 110, enforcement platforms 125, tracking and billing servers 130, front-end notification servers 135, application servers 140, incentive profile servers 145, service QA platforms 150, content providers 160, social network servers 170, or user devices 180. Components of network environment 100 may be connected via wired and/or wireless links.

Figure 2:
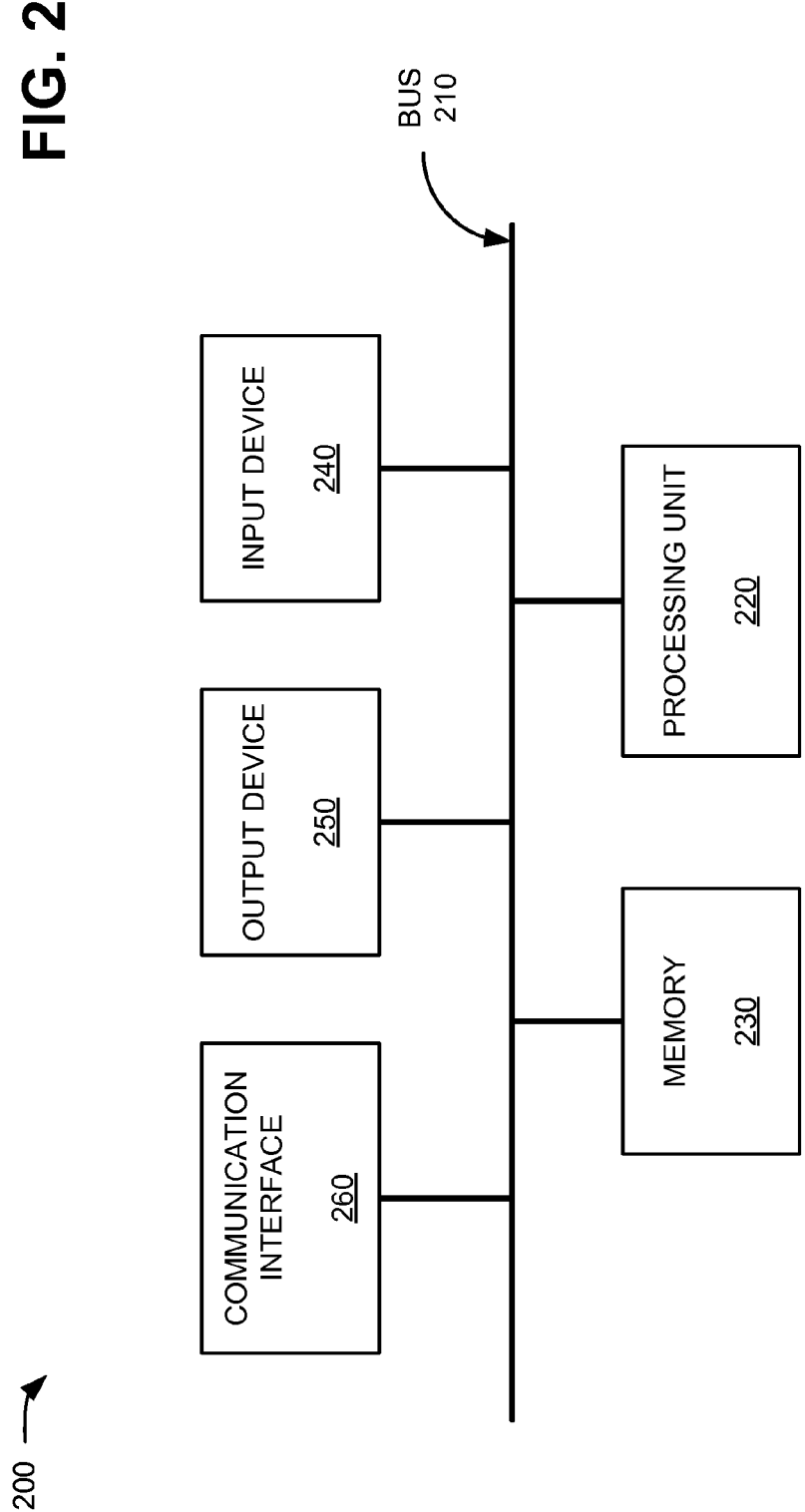
FIG. 2 is a block diagram of exemplary components of a device that may correspond to one of the devices of FIG. 1.

FIG. 2 is a diagram of exemplary components of a device 200. Each of enforcement platform 125, tracking and billing server 130, front-end notification server 135, application server 140, incentive profile server 145, service QA platform 150, content provider 160, social network server 170, and user device 180 may be implemented/installed as software, hardware, or a combination of hardware and software, on its respective device 200. In one implementation, device 200 may be configured as a network device that communicates over a network via communication interface 260. In another implementation, device 200 may be configured as part of an STB or media server. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a remote control, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices in network environment 100. Each of such other devices of network environment 100 may include its respective communication interface 260 to achieve such communication.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. Alternatively, or additionally, one or more components of device 200 may perform one or more other tasks described as being performed by one or more other components of device 200.

Figure 3:
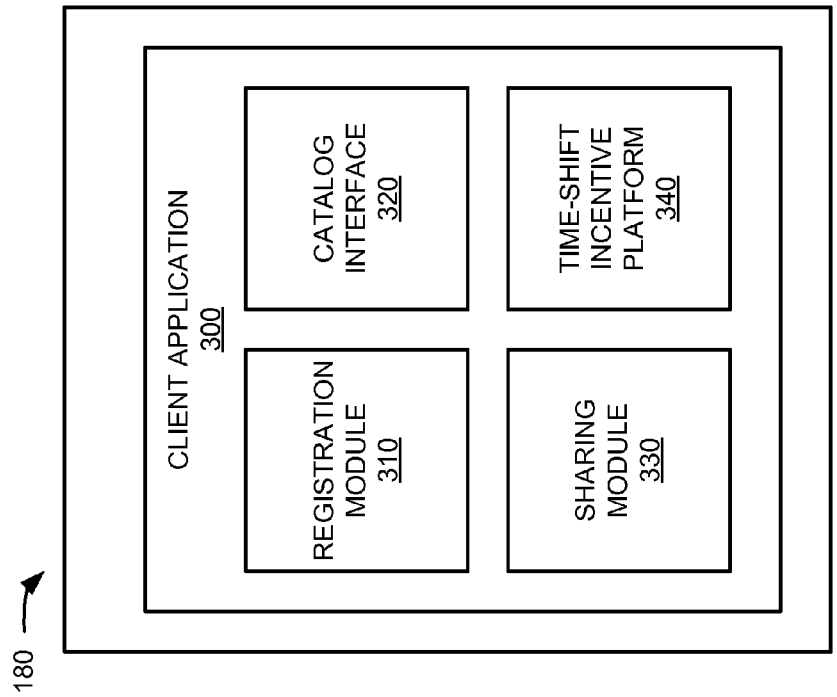
FIG. 3 is a block diagram of exemplary functional components of the user device of FIG. 1.

FIG. 3 is a block diagram of exemplary functional components of user device 180. The functions described in connections with FIG. 3 may be performed by one or more components of device 200 (FIG. 2). As shown in FIG. 3, user device 180 may include a client application 300 that includes a registration module 310, a catalog interface 320, a sharing module 330, and a time-shift incentive platform 340.

Client application 300 may include hardware and software components. The software components may be downloaded, for example, from application server 140 when user device 180 contacts application server 140 to register for service or to request TFD content. In other implementations, client application 300 may be provided as part of an operating system or operating system update.

Registration module 310 may register users 185 and/user devices 180 for access to TFD services (e.g., service to retrieve and manage TFD content) from service provider network 110. For example, registration module 310 may provide a user interface to enable a user of user device 180 to associate a user ID with client application 300. Registration module 310 may solicit user credentials (e.g., a client ID and password) for a user's wireless or home network account. In one aspect, registration module 310 may also solicit a customer email address to facilitate off-line notifications. Upon receipt of the user credentials, registration module 310 may activate client application 300 to retrieve TFD content listings and to generate sharing URLs.

Catalog interface 320 may communicate with content registration server 120 and/or application server 140 to retrieve a listing of available TFD content. The listing of available TFD content may include content from multiple content providers 160. In one implementation, catalog interface 320 may include TFD content as a distinct subset of a larger set of content (e.g., including TFD and non-TFD content). In another implementation, catalog interface 320 may present TFD content exclusively. Catalog interface 320 may also store user preferences to present or exclude particular categories of TFD content and/or non-TFD content. In another implementation, catalog interface 320 may provide a searchable interface. Catalog interface 320 may allow a user to identify and consume TFD content from within client application 300 for free (e.g., without accruing data charges or accounting against a monthly data use limit). Additionally, catalog interface 320 may permit a user to select non-TFD content for consumption.

Sharing module 330 may include a user interface to allow users to generate unique links to selected TFD content from catalog interface 320. In one implementation, sharing module 330 may communicate with application server 140 to generate a unique sharing URL (based on the user's ID) for each person who shares the same TFD content. Sharing module 330 may store the sharing URL. In one implementation, sharing module 330 may interface with a social media application or API to upload the sharing URL to the TFD sharer's social media account, where the sharing URL may be accessed by other social medial users. Tracking and billing server 130 may keep track of data consumption and the number of clicks/views to the sharing URL, and may reward the TFD sharer accordingly.

Time-shift incentive platform 340 may communicate with service QA platform 150 to identify when current network conditions are not adequate to support high-quality data transfer for a user's selected content. Based on information from service QA platform 150, time-shift incentive platform 340 may also provide a user interface to present options to postpone consumption of selected content when network conditions are not adequate and to present incentives to postpone consumption. Time-shift incentive platform 340 may receive user input (e.g., to postpone or not postpone consumption of selected content). Time-shift incentive platform 340 may forward a user's election to service QA platform 150 and/or incentive profile server 145 implement a user's election and to manage incentive reward options when a user agrees to postpone consumption.

Although FIG. 3 shows exemplary functional components of user device 180, in other implementations, user device 180 may include fewer components, different components, or additional components than those depicted in FIG. 3. For example, in other implementations, user device 180/client application 300 may include a media playing component.

Figure 4:
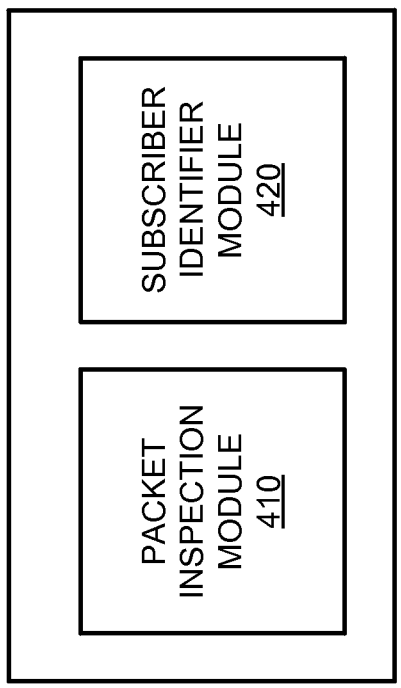
FIG. 4 is a block diagram of exemplary functional components of the enforcement platform 125 of FIG. 1.

FIG. 4 is a block diagram of exemplary functional components of enforcement platform 125. The functions described in connections with FIG. 4 may be performed by one or more components of device 200 (FIG. 2). As shown in FIG. 4, enforcement platform 125 may include a packet inspection module 410 and subscriber identifier module 420.

Packet inspection module 410 may recognize TFD content that is to be provided to user devices 180 via network 110. For example, packet inspection module 410 may extract a snippet identifier from a packet flow. In one implementation, packet inspection module 410 may compare the snippet identifier against a data table of unique TFD content identifiers (e.g. URLs or other identifiers) obtained by content registration server 120 when TFD content items are registered by content providers 160.

Subscriber identifier module 420 may insert a unique subscriber identifier into TCP/IP packets to represent the mobile identity of a mobile user associated with user device 180. In some implementations, the subscriber identifier may be inserted into an existing packet header or included in a new packet header. The subscriber identifier may be used, for example, to log TFD consumption by individual users.

Although FIG. 4 shows exemplary functional components of enforcement platform 125, in other implementations, enforcement platform 125 may include fewer components, different components, or additional components than those depicted in FIG. 4.

Figure 5:
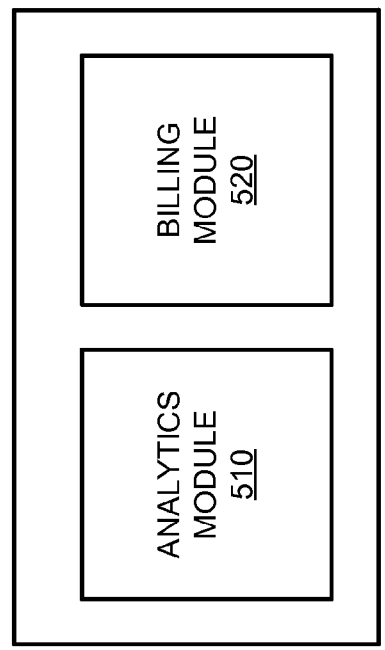
FIG. 5 is a block diagram of exemplary functional components of the tracing and billing server of FIG. 1.

FIG. 5 is a block diagram of exemplary functional components of tracking and billing server 130. The functions described in connections with FIG. 5 may be performed by one or more components of device 200 (FIG. 2). As shown in FIG. 5, tracking and billing server 130 may include an analytics module 510 and a billing module 520.

Analytics module 510 may determine data usage associated with access to TFD content for websites or applications for each particular content provider. Analytics module 510 may track data usage associated with each end user that consumes TFD content, such as visiting designated toll-free sections of a content provider 160 website, and provide the data usage to billing module 520. Analytics module 510 may also keep track of the number of times a particular sharing URL is requested and log credits for a TFD sharer. In one implementation, analytics module 510 may filter out duplicate request from the same user device 180. Analytics module 510 may provide credit counts (e.g., for use of a particular sharing URL or for a particular TFD sharing account) to incentive profile server 145.

Billing module 520 may receive data usage information from analytics module 510 and subsequently bill the content provider 160 based, for example, on a predetermined arrangement between content provider 160 and the service provider network 110.

Although FIG. 5 shows exemplary functional components of tracking and billing server 130, in other implementations, tracking and billing server 130 may include fewer components, different components, or additional components than those depicted in FIG. 5.

Figure 6:
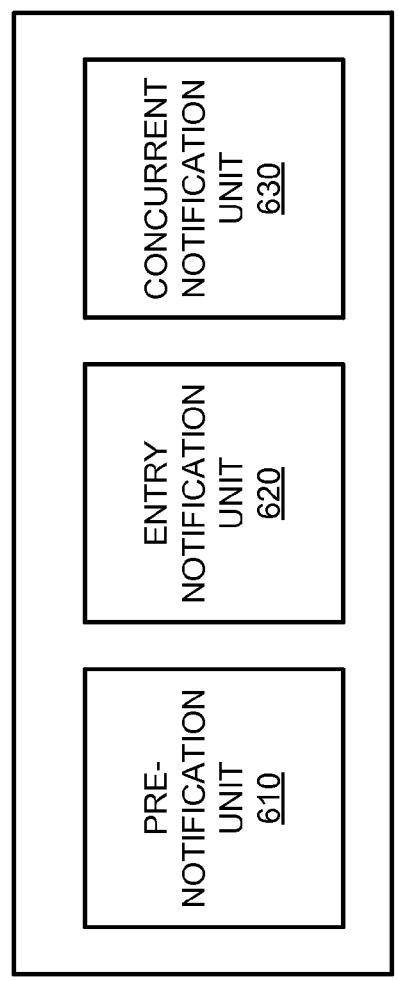
FIG. 6 is a block diagram of exemplary functional components of the front-end notification server of FIG. 1.

FIG. 6 is a block diagram of exemplary functional components of front-end notification server 135. The functions described in connections with FIG. 6 may be performed by one or more components of device 200 (FIG. 2). As shown in FIG. 6, front-end notification server 135 may include a pre-notification unit 610, an entry notification unit 620, and a concurrent notification unit 630.

Pre-notification unit 610 may provide an indication to a user of user device 180 that a particular link to TFD content provides a toll-free experience (e.g., will not be credited toward a user's monthly data limit and/or accrue data use charges). For example, based on a list of registered content from content registration server 120, pre-notification unit 610 may provide, to user device 180, a pre-use notification (e.g., a symbol or other indication adjacent to a TFD URL) to differentiate links to TFD content from links to regular content.

Entry notification unit 620 may provide an entry notification to indicate when a user is entering a website or other service with a toll-free experience. For example, when a user of user device accesses a TFD URL, entry notification unit 620 may identify the URL as a toll-free (e.g., based on a list of registered content from content registration server 120) and provide a splash page or alert window to identify that the user has accessed toll-free content.

Concurrent notification unit 630 may provide a concurrent notification to indicate a TFD environment while a user is accessing a website or service. For example, after a user has entered an area of toll-free content via a TFD URL, concurrent notification unit 630 may provide a banner or icon, concurrently with the TFD content, that identifies the current site as toll-free.

Although FIG. 6 shows exemplary functional components of front-end notification server 135, in other implementations, front-end notification server 135 may include fewer components, different components, or additional components than those depicted in FIG. 6.

Figure 7:
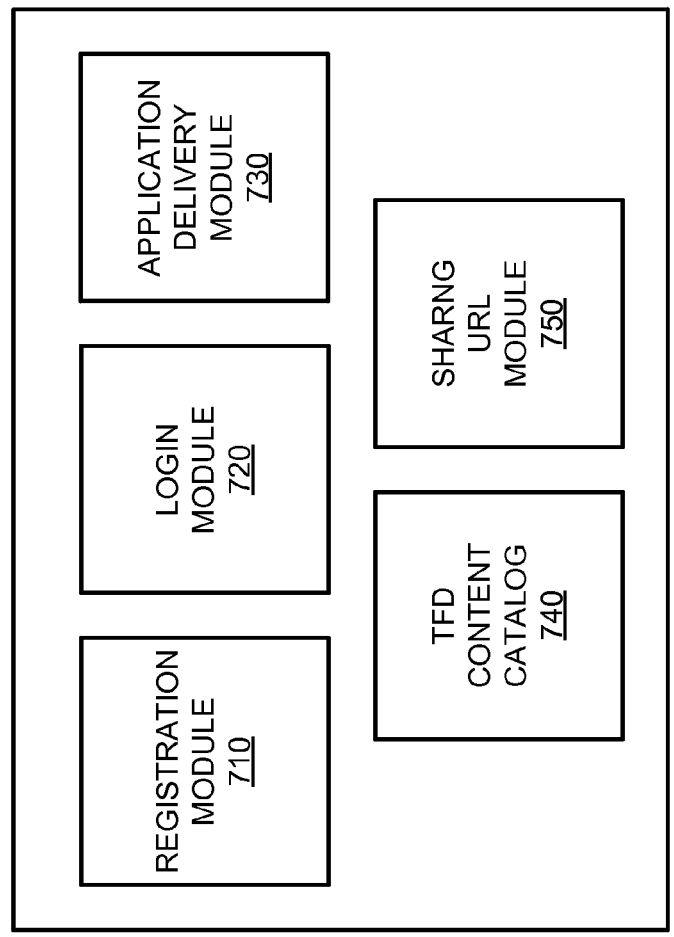
FIG. 7 is a block diagram of exemplary functional components of the application server of FIG. 1.

FIG. 7 is a block diagram of exemplary functional components of application server 140. The functions described in connections with FIG. 7 may be performed by one or more components of device 200 (FIG. 2). As shown in FIG. 7, application server 140 may include a registration module 710, a login module 720, an application delivery module 730, a TFD content catalog 740, and a sharing URL module 750.

Registration module 710 allows a user to register if the user is not registered in the TFD system of network 110. For example, registration module 710 may allow a new user to associate a new device ID, MDN, user name, and/or password upon providing appropriate credentials. In one implementation, a unique sharing code may be assigned to the user as part of the registration process. The unique sharing code may be stored, for example, as part of the user profile created for the user.

Login module 720 may perform authentication processes for the user and client application 300. Login module 720 may prompt user device 180 or user 185 to provide credentials after registration. Login module 720 may also provide server authentication tokens when required in communicating with other platforms.

Application delivery module 730 may provide client application 300 to user device 180. For example, after an indication of a successful registration from registration module 710, application delivery module 730 may allow a user device 180 to download client application 300.

TFD content catalog 740 may collect and provide listings of TFD content available to user devices 180. For example, TFD content catalog 740 may receive TFD content metadata, such as titles, URLs, and categories of TFD content, from content registration server 120. TFD content catalog 740 may use the TFD content metadata to provide currently-available TFD content options to user devices 180 (e.g., client application 300).

Sharing URL module 750 may generate a unique sharing URL for TFD content that is selected for sharing via client application 300. The unique sharing URL associates the TFD sharer and the TFD URL for the selected content. In one implementation, the sharing URL may be generated by adding a sharing code to the end of a regular TFD content link (the TFD URL as registered by content provider 160 with content registration server 120). For example, assume a unique sharing code of 57gf4 is assigned to a particular user (e.g., during registration with registration module 710). A TFD URL of http://freewve.com/123abc would become a unique sharing URL of http://freewve.com/123abc/57gf4 for that user, with the unique sharing code 57gf4 added to the original content URL.

Although FIG. 7 shows exemplary functional components of application server 140, in other implementations, application server 140 may include fewer components, different components, or additional components than those depicted in FIG. 7.

Figure 8:
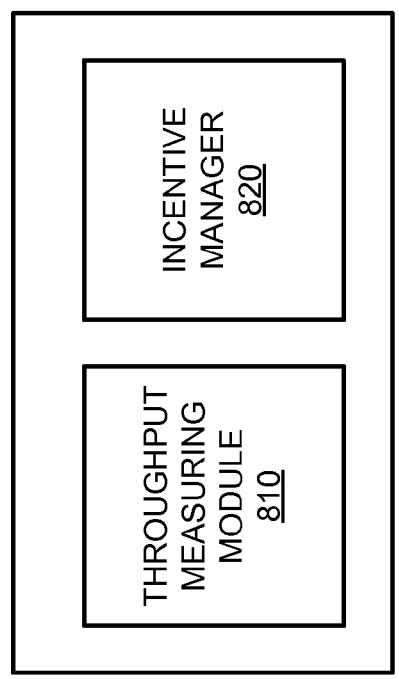
FIG. 8 is a block diagram of exemplary functional components of the service quality assurance (QA) platform of FIG. 1.

FIG. 8 is a block diagram of exemplary functional components of service QA platform 150. The functions described in connections with FIG. 8 may be performed by one or more components of device 200 (FIG. 2). As shown in FIG. 8, service QA platform 150 may include a throughput measuring module 810 and an incentive manager 820.

Throughput measuring module 810 may monitor the network congestion status (e.g., of service provider network 110) to identify if current network conditions are sufficient to support high-quality data transfer for a user's selected content. In one implementation, throughput measuring module 810 may obtain a snippet of a user's selected content from content provider 160 and may monitor end-to-end throughput and/or other delivery metrics. In another implementation, throughput measuring module 810 may use a generic sample from content provider 160. Throughput measuring module 810 may determine if current network conditions are sufficient to support high-quality data transfer based on, for example, a current minimum available bandwidth across a portion of network 110, streaming requirements for the selected content, current download speeds experienced by user device 180, network 110 throughput, etc. In one implementation, throughput measuring module 810 may compare measurements from the snippet delivery against a particular threshold value that indicates that delivery of the selected content can be supported. Additionally, or alternatively, throughput measuring module 810 may apply regional time-based predictive analysis to identify peak use periods of, for example, a user device's current last-mile network. In another implementation, throughput measuring module 810 may apply location-based analysis to identify when a user device 180 enters/exits a congested area.

Incentive manager 820 may provide one or more possible incentives for a user to consume content at a later time when throughput measuring module 310 identifies that current network conditions are not sufficient to support high-quality data transfer. Incentive manager 820 can suggest delaying consuming of the particular content until a time when better quality will be possible. In one implementation, incentive manager 820 can provide a notification (e.g., a text message, an email, a pop-up message in client application 300, etc.) for the user when network conditions are at an acceptable level to support high quality data delivery. In another implementation, incentive manager 820 may suggest a future time when the network conditions are likely to be at an acceptable level. In still another implementation, incentive manager 820 may solicit user input to schedule a particular time in the future to view the content selected by the user. As one example, incentive manager 820 may provide a suggested time window and an incentive (e.g., a discount, reward points, delivery as of the selected content as TFD, etc.) to schedule viewing during an off-peak time.

Incentives to consume the content at a later time may include, for example, that the content's data size (or some portion thereof) will not count against end-user's data plan (e.g., for users not on an unlimited data plan). In the case of this incentive, the incentive manager 820 may generate a user-specific TFD URL for the selected content item, based on the unique code for the user and a URL for the selected content item, and may provide the user-specific TFD URL to user device 180/user 185. As another example of an incentive, the user may earn points applicable to a rewards program. In one implementation, the number of points may correspond to the data size of the selected content that was postponed. As still another incentive example, the equivalent of the selected content's data size (or some portion thereof) can be donated to a charity.

Incentive manager 820 may receive a user's selection to postpone consumption of selected content and apply a selected incentive. Incentive manager 820 may, for example, provide an indication of the selected incentive to incentive profile server 145. In one implementation, incentive manager 820 (or time-shift incentive platform 340 on user device 180) may register a user's first incentive election as a default preference.

Although FIG. 8 shows exemplary functional components of service QA platform 150, in other implementations, service QA platform 150 may include fewer components, different components, or additional components than those depicted in FIG. 8.

Figure 9:
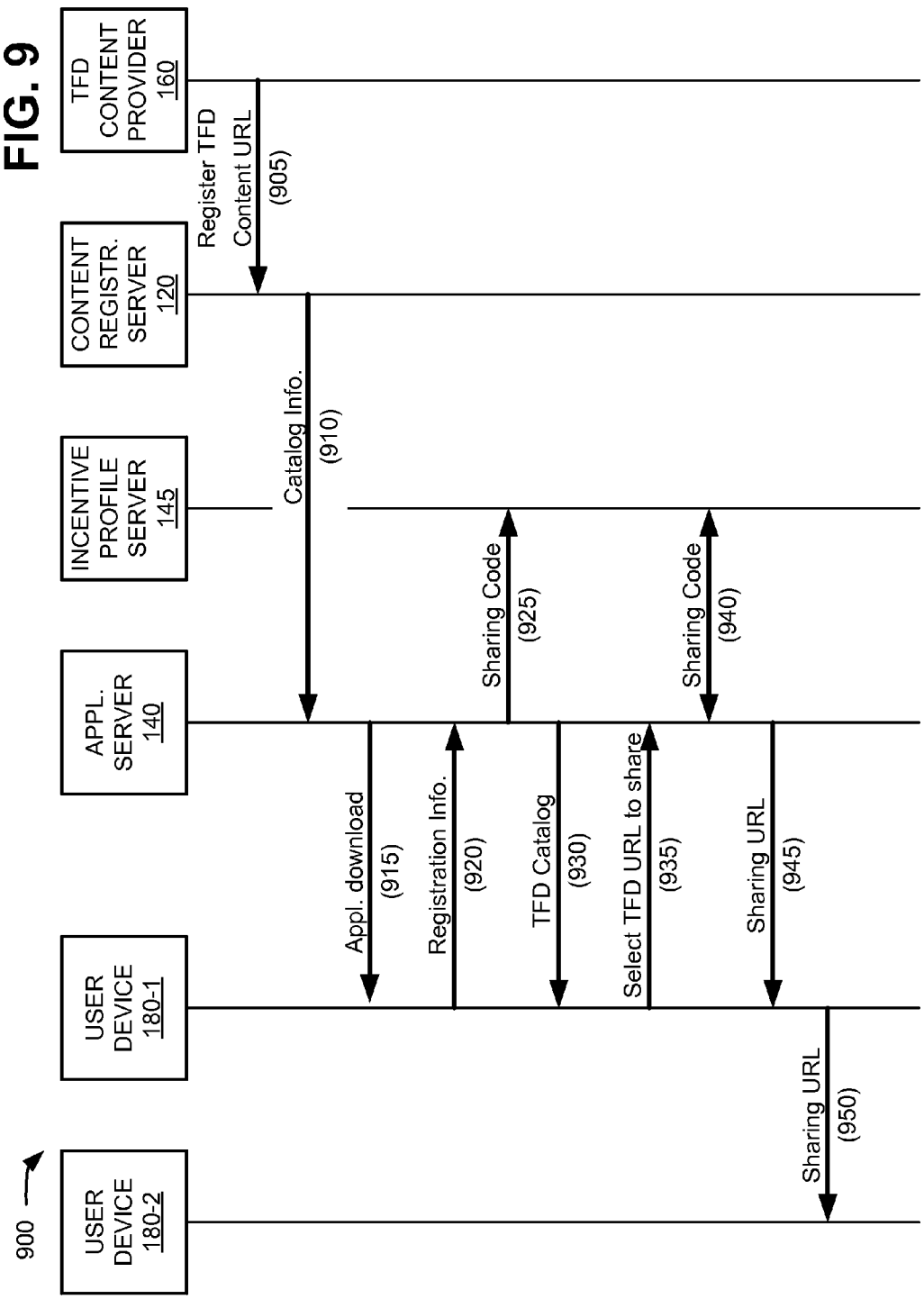
FIGS. 9 and 10 are diagrams of exemplary communications among devices, servers, and systems in a portion of the network environment of FIG. 1.

FIG. 9 is a diagram of exemplary communications among devices, servers and systems in a portion 900 of network environment 100. Communications in FIG. 9 may represent communications for sharing a link to TFD content. As shown in FIG. 9, network portion 900 may include content registration server 120, application server 140, incentive profile server 145, content provider 160, and user devices 180-1 and 180-2. Content registration server 120, application server 140, incentive profile server 145, content provider 160, and user devices 180 may include features described above in connection with, for example, FIGS. 1-7.

As shown in communication 905 of FIG. 9, content provider 160 may register a TFD content URL with content registration server 120. Content registration server 120 may incorporate the TFD content URL with data for other registered TFD content and provide the compiled information to application server 140 as catalog information, as shown in communication 910. Application server 140 may store the catalog information (including the TFD content URL). Communications 905 and 910 may be repeated to provide updated catalog information.

At another point in time, application server 140 may provide (e.g., in response to a request from user device 180-1 or a software/firmware upgrade, not shown) a client application (e.g., client application 300) to user device 180-1, as shown in communication 915. User device 180-1 may provide registration information to application server 140 to initiate client application 300 and login to access TFD services, as shown in communication 920. In response to the registration information, application server 140 may create a unique sharing code for the user that may be added, in communication 925, to a user profile in incentive profile server 145.

As shown in communication 930, a user may use the client application to request and receive a catalog of TFD content from application server 140. The user may identify a toll-free item of interest and select, from the catalog, a TFD URL to share. Using a sharing option in the TD client application, user device 180-1 may indicate to application server 140 the selected TFD URL to share (communication 935). In response, application server 140 may retrieve the user's sharing code from incentive profile server 145 (communication 940) and, using the sharing code, may generate a sharing URL that associates the user of user device 180-1 (e.g., the TFD sharer) with the selected TFD content of interest. Application server 140 may provide the sharing URL to user device 180-1, as indicated by communication 945. The user of user device 180-1 may distribute the sharing URL to user device 180-2 (and other user devices 180) via one or more social networks, emails, instant messages, or other distribution formats.

Although FIG. 9 shows exemplary communications of network portion 900, in other implementations, different communications may be used than those depicted in FIG. 9 to share a link to TFD content. For example, in another implementation, user device 180-1 may receive a sharing code from application server 140 as part of a registration process and may generate a sharing URL without the need to contact application server when a user selects a TFD URL to share.

Figure 10:
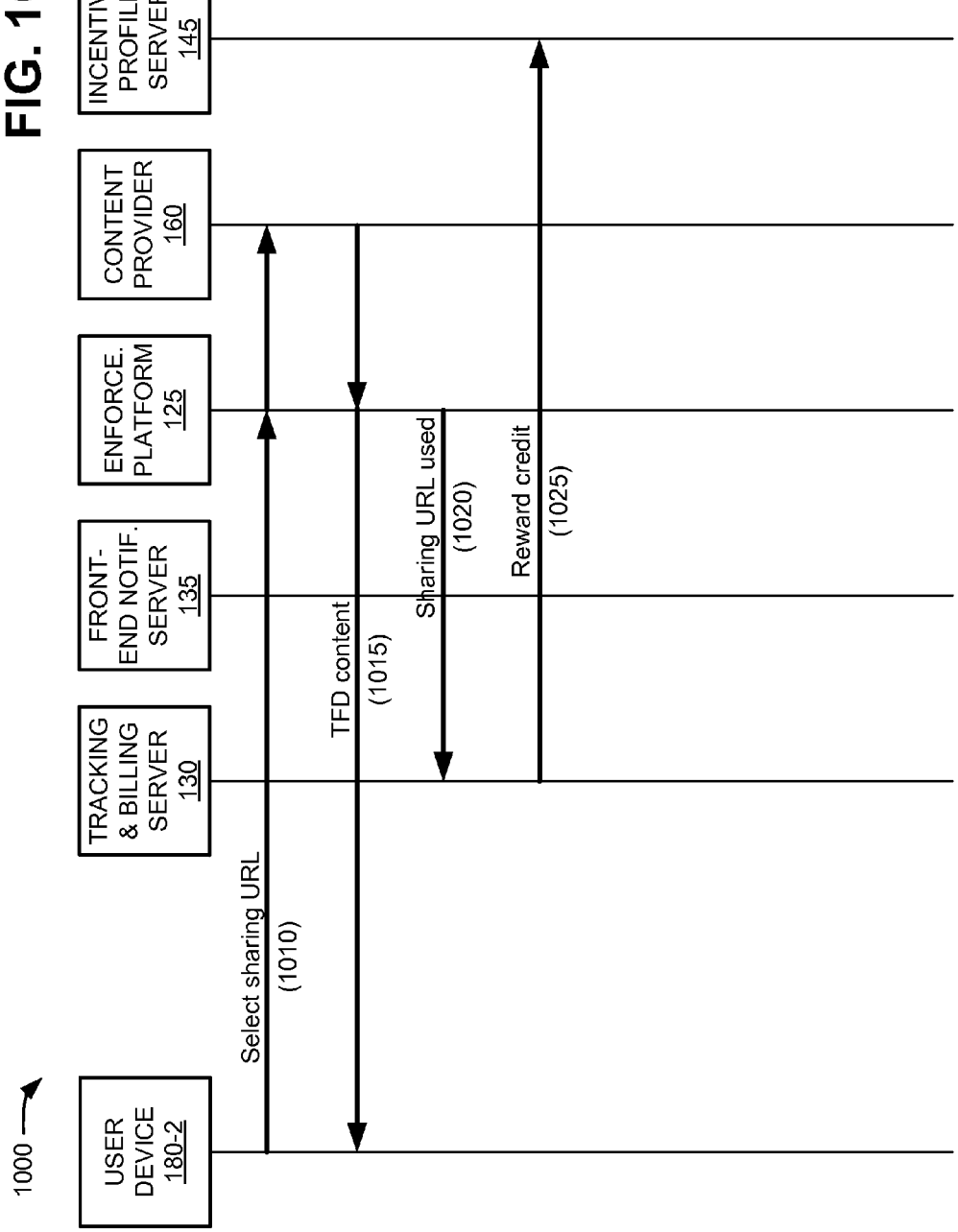

FIG. 10 is a diagram of exemplary communications among devices, servers and systems in a portion 1000 of network environment 100. Communications in FIG. 10 may represent communications for using a shared link to TFD content. As shown in FIG. 10, network portion 1000 may include user device 180-2, tracking and billing server 130, front-end notification server 135, enforcement platform 125, content provider 160, and incentive profile server 145. User device 180-2, tracking and billing server 130, front-end notification server 135, enforcement platform 125, content provider 160, and incentive profile server 145 may include features described above in connection with, for example, FIGS. 1-8.

As shown in communication 1010 of FIG. 10, a user of user device 180-2 may use a sharing URL (e.g., the sharing URL received via communication 950 of FIG. 9), to request TFD content. A request generated by the sharing URL may pass through enforcement platform 125, which may detect the TFD sharer's unique sharing code from the sharing URL. Content provider 160 may receive the request for content via sharing URL and may provide the corresponding TFD content to user device 180-2, as indicated by communication 1015. Based on detecting the unique sharing URL in communication 1010, enforcement platform 125 may provide to tracking and billing server 130 an indication that the sharing URL, associated with the particular TFD sharer, was used. Tracking and billing server 130 may receive the indication and eventually assign reward credits for the TFD sharer (i.e., whose unique sharing code was included in the sharing URL) and provide the credit update to incentive profile server 145, as shown in communication 1025.

Although FIG. 10 shows exemplary communications of network portion 1000, in other implementations, different communications may be used than those depicted in FIG. 10 to access a shared link to TFD content. Additionally, the communications explained and illustrated in FIGS. 9 and 10 are exemplary and do not represent each and every message that may be exchanged to share a link and use a shared link to TFD content. For example, various initiation and acknowledgement messages may be used where a single communication event is shown.

Figure 11:
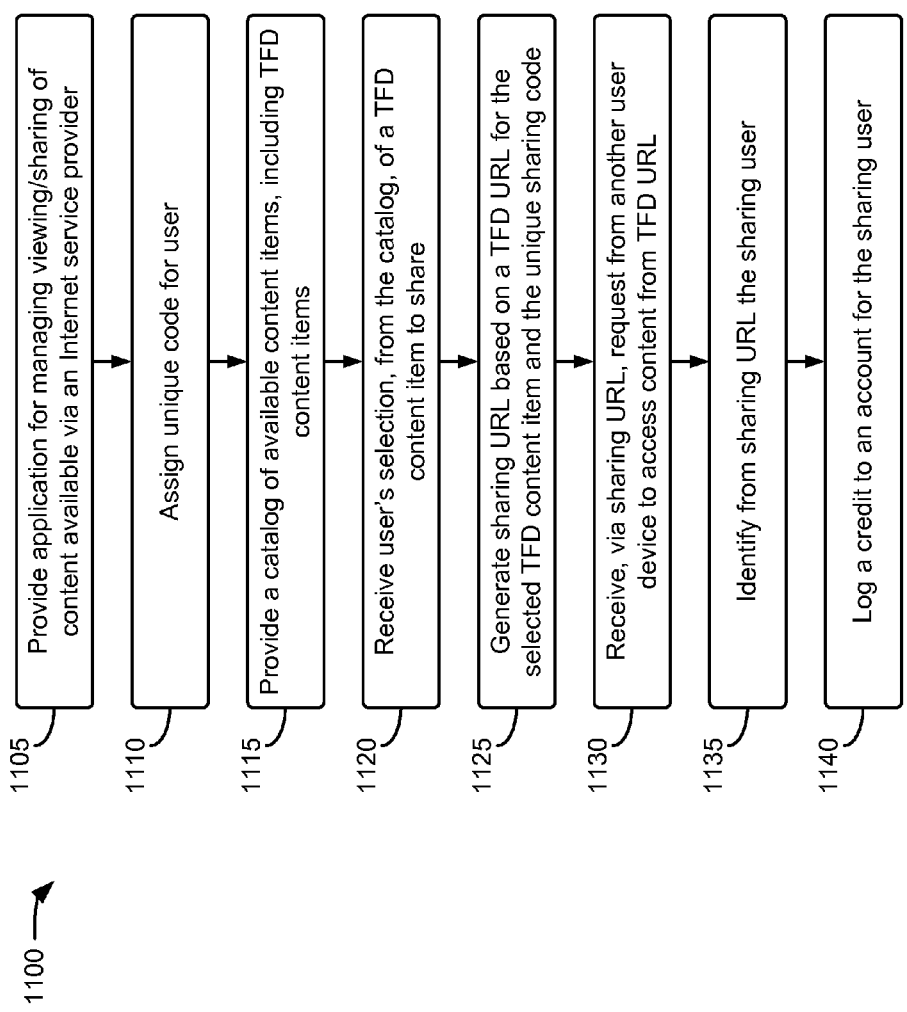
FIG. 11 is a flow diagram of an exemplary process for sharing a link to TFD content according to an implementation described herein.

FIG. 11 is a flow diagram of an exemplary process 1100 for sharing a link to TFD content. In one implementation, process 1100 may be performed by one or more devices from service provider network 110 (including, for example, application server 140). In another implementation, process 1100 may be performed by one or more devices from service provider network 110 in conjunction with user device 180 (e.g., executing client application 300).

Process 1100 may include providing an application for managing viewing and/or sharing of content available via an Internet service provider (block 1105) and assigning a unique code for the user (block 1110). For example, when user device 180 registers for TFD services, application server 140 may assign a unique sharing code to the registering user and provide (e.g., upload) client application 300 to user device 180.

Process 1100 may also include providing a catalog of available content items, including TFD content items, to the user device (block 1115), receiving the user's selection, from the catalog, of a TFD content item to share (block 1120), and generating a sharing URL based on a TFD URL for the selected TFD content item and the unique sharing code (block 1125). For example, user 185 may use client application 300 to request and receive a catalog of TFD content from application server 140. User 185 may identify a TFD content item of interest and select, from the catalog, a TFD URL to share. Using a sharing option in TD client application 300, user device 180 may indicate to application server 140 the selected TFD URL to share. In response, application server 140 may retrieve the user's sharing code from incentive profile server 145 and may generate a sharing URL.

Process 1100 may further include receiving, via the sharing URL, a request from another user device to access content from TFD URL (block 1130), identifying, from the sharing URL, the sharing user (block 1135), and logging a credit to an account for the sharing user (block 1140). For example, application server 140 may provide the sharing URL to user device 180, which may be shared with other users via social media (e.g., social network servers 170) or direct messages (e.g. email, text messages, etc.). When one of the other users selects the sharing URL, enforcement platform 125 may detect the TFD sharer's unique sharing code from the sharing URL before passing the request to content provider 160. Based on detecting the unique sharing URL, enforcement platform 125 may provide to tracking and billing server 130 an indication that the sharing URL, associated with the particular TFD sharer, was used. Tracking and billing server 130 may receive the indication and eventually assign reward credits for the TFD sharer (i.e., whose unique sharing code was included in the sharing URL) and provide the credit update to incentive profile server 145.

Figure 12:
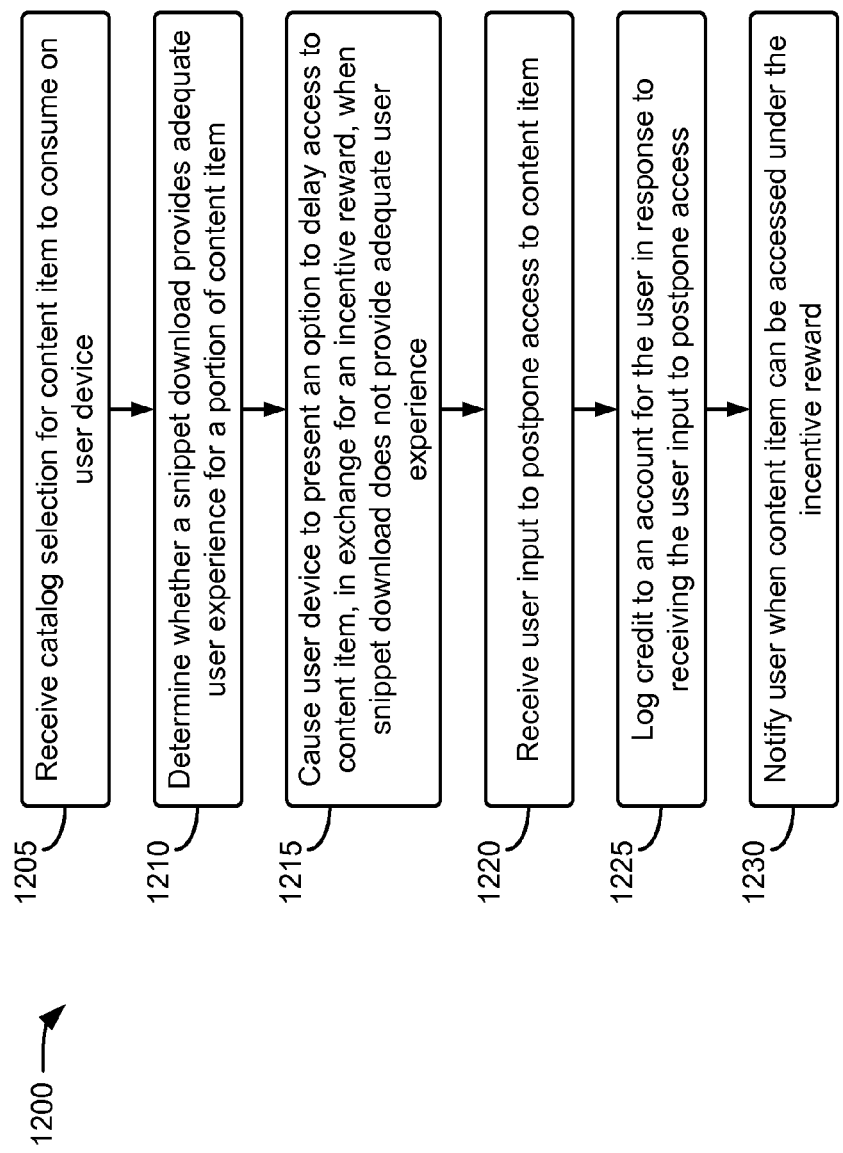
FIG. 12 is a flow diagram of an exemplary process for using TFD content to incentivize time-shifting data services according to an implementation described herein.

FIG. 12 is a flow diagram of an exemplary process 1200 for using TFD content to incentivize time-shifting data services. In one implementation, process 1200 may be performed by one or more devices from service provider network 110 (including, for example, application server 140). In another implementation, process 1200 may be performed by one or more devices from service provider network 110 in conjunction with user device 180 (e.g., executing client application 300).

Process 1200 may include receiving a catalog selection for content item to consume on a user device (block 1205), determining whether a snippet download provides an adequate user experience for a portion of the content item (block 1210), and causing the user device to present an option to delay access to the content item, in exchange for an incentive reward, when the snippet download does not provide an adequate user experience (block 1215). For example, content provider 160 may receive a selection of a catalog item from catalog interface 320 on user device 180. If the user has opted in to participate in a time-shifting service, service QA platform 150 may monitor delivery of a snippet of the requested content. Service QA platform 150 may recommend postponing consumption (e.g., time-shifting) when conditions of network 110 are not adequate for a high-quality user experience. The recommendation to postpone consumption may be presented to the user via time-shift incentive platform 340.

Process 1200 may also include receiving user input to postpone access to content item (block 1220), logging credit to an account for the user in response to receiving the user input to postpone access (block 1225), and notifying the user when the content item can be accessed under the incentive reward (block 1230). For example, if the user chooses to postpone consumption via time-shift incentive platform 340, user device 180 may provide the user input to service QA platform 150. Service QA platform 150 may receive a user's selection to postpone consumption of selected content and apply a selected incentive. Service QA platform 150 may, for example, provide an indication of the selected incentive to incentive profile server 145. In one implementation, incentive profile server 145 may monitor when the content item can be accessed by the user (e.g., when a peak use condition expires) and notify the user.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, although network environment 100 includes a separate enforcement platform 125, tracking and billing server 130, and front-end notification server 135, according to other embodiments, two or more of these devices may be combined or their functions distributed among different components within network environment 100. An another example, while series of blocks have been described with respect to FIGS. 11 and 12, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    providing, by a network device and to a first user device, an application for managing viewing and sharing of content available via an Internet service provider;
    assigning, by the network device, a unique code for a user of the first user device;
    providing, by the network device, a catalog of available content items, wherein the catalog includes toll-free data (TFD) content items with a different TFD uniform resource locator (URL) for each TFD content item in the catalog of available content items;
    receiving, by the network device, a user selection, from the catalog, of a TFD content item to share;
    generating, by the network device, a sharing URL that associates a TFD URL for the selected TFD content item and the unique code of the user of the first device;
    providing, by the network device, the sharing URL to the first user device;
    logging, by the network device, a use of the sharing URL associated with the user of the first user device when a second user device accesses the selected TFD content item via the sharing URL;
    extracting, by the network device, a snippet identifier from a packet flow that includes the TFD content item;
    comparing, by the network device, the snippet identifier against a data table of unique TFD content identifiers to monitor TFD usage;
    receiving, by the network device, another user selection, from the catalog, of a second content item to consume on the first user device;
    determining by the network device whether a download performance from a content provider to the first user device, provides an adequate user experience for a portion of the second content item; and
    causing by the network device and when the download performance does not provide an adequate user experience, the first user device to present an option, to the user, to delay access to the second content item, for a waiting period, in exchange for an incentive reward.

2. The method of claim 1, further comprising:
    sending, by the first user device, the sharing URL to a second user device.

3. The method of claim 2, wherein sending the sharing URL includes one or more of:
    posting the sharing URL on a social media network, and
    sending a message directly to the second user device.

4. The method of claim 1, wherein logging the use of the sharing URL comprises:
    receiving, by the network device and via the sharing URL, a request from the second user device to access the selected content item associated with the TFD URL;
    identifying, by the network device and from the sharing URL used by the second user device, the user of the first user device; and logging, by the network device and in response to the identifying, a credit to an account for the user of the first user device.

5. The method of claim 4, wherein logging the credit includes:
registering user credit for a certain amount of toll-free data sponsored by the Internet service provider.

6. The method of claim 1, further comprising:
receiving, from the first user device, user input to postpone access to the second content item; and
logging, by the network device and in response to the receiving the user input to postpone access, a credit to an account for the user of the first user device.

7. The method of claim 1, wherein the incentive includes: toll-free access, for the user, to at least a portion of the second content item at a future time.

8. The method of claim 7, further comprising:
generating, by the network device, a user-specific TFD URL for the second content item based on the unique code for the user and a URL for the second content item; and
providing, by the network device, the user-specific TFD URL to the first user device.

9. The method of claim 1, further comprising:
when network conditions permit the adequate user experience for accessing the second content item, notifying, by the network device, the first user device that the second content item can be accessed under the incentive reward.

10. The method of claim 9, wherein the notifying includes one or more of:
sending a text message to an account associated with the user,
sending message to an email address associated with the user, and
providing a push notification via the application for managing viewing and sharing of the content.

11. The method of claim 1, wherein the determining whether a download performance provides an adequate user experience includes:
evaluating a download speed of a code snippet of the second content, or
identifying a peak usage scenario associated with a location of the first user device.

12. A network device, comprising:
a communications interface to communicate with user devices;
a memory for storing instructions to be executed by one or more processors; and
the one or more processors configured to execute the instructions to:
provide, to a first user device, an application for managing viewing and sharing of content available via an Internet service provider;
assign a unique code for a user of the first user device;
provide a catalog of available content items, wherein the catalog includes toll-free data (TFD) content items with a different TFD uniform resource locator (URL) for each TFD content item in the catalog of available content items;
receive a user's selection, from the catalog, of a TFD content item to share;
generate a sharing URL that associates a TFD URL for the selected TFD content item and the unique code of the user of the first device;
provide the sharing URL to the first user device;
log a use of the sharing URL associated with the user of the first user device when a second user device accesses the selected TFD content item via the sharing URL;
extract a snippet identifier from a packet flow that includes the TFD content item;
compare the snippet identifier against a data table of unique TFD content identifiers to monitor TFD usage;
receive another user selection, from the catalog, of a second content item to consume on the first user device;
determine whether a download performance, from a content provider to the first user device, provides an adequate user experience for a portion of the second content item; and
cause, when the download performance does not provide an adequate user experience, the first user device to present an option, to the user of the first user device, to delay access to the second content item, for a waiting period, in exchange for an incentive reward.

13. The network device of claim 12, wherein, when logging the use of the sharing URL, the one or more processors are further configured to:
receive, via the sharing URL, a request from the second user device to access the selected content item associated with the TFD URL;
identify, from the sharing URL used by the second user device, the user of the first user device; and
log, in response to the identifying, a credit to an account for the user of the first user device.

14. The network device of claim 13, wherein, when logging the credit to the account for the user of the first user device, the one or more processors are further configured to:
register user credit for a certain amount of toll-free data to be sponsored by the Internet service provider.

15. The network device of claim 12, wherein the sharing URL is sponsored by a third party content provider, and wherein the one or more processors are further configured to:
apply charges for data consumed by an end user of the sharing URL to the third party content provider.

16. The network device of claim 12, wherein the one or more processors are further configured to:
receive another selection, from the catalog, of a second content item to consume on the first user device; and
cause, when a network performance does not provide an adequate user experience for downloading the second content item, the first user device to present an option, to the user, to delay access to the second content item, for a waiting period, in exchange for an incentive reward.

17. A non-transitory computer-readable medium, storing instructions executable by one or more processors, the non-transitory computer-readable medium comprising one or more instructions to:
provide, to a first user device, an application for managing viewing and sharing of content available via an Internet service provider;
assign a unique code for a user of the first user device;
provide a catalog of available content items, wherein the catalog includes toll-free data (TFD) content items with a different TFD uniform resource locator (URL) for each TFD content item in the catalog of available content items;

receive a user's selection, from the catalog, of a TFD content item to share;
generate a sharing URL that associates a TFD URL for the selected TFD content item and the unique code of the user of the first device;
provide the sharing URL to the first user device;
log a use of the sharing URL associated with the user of the first user device when a second user device accesses the selected TFD content item via the sharing URL;
extract a snippet identifier from a packet flow that includes the TFD content item;
compare the snippet identifier against a data table of unique TFD content identifiers to monitor TFD usage;
receive another user selection from the catalog of a second content item to consume on the first user device;
determine whether a download performance, from a content provider to the first user device, provides an adequate user experience for a portion of the second content item; and
cause, when the download performance does not provide an adequate user experience, the first user device to present an option, to the user of the first user device, to delay access to the second content item, for a waiting period, in exchange for an incentive reward.

18. The non-transitory computer-readable medium of claim 17, further comprising one or more instructions to:
receive another selection, from the catalog, of a second content item to consume on the first user device; and
cause, when a network performance does not provide an adequate user experience for downloading the second content item, the first user device to present an option, to the user, to delay access to the second content item, for a waiting period, in exchange for an incentive reward.

19. The non-transitory computer-readable medium of claim 18, further comprising one or more instructions to:
receive, from the first user device, user input to postpone access to the second content item; and
log, in response to the receiving the user input to postpone access, a credit for toll-free access, for the user, to at least a portion of the second content item at a future time.

20. The non-transitory computer-readable medium of claim 18, further comprising one or more instructions to:
receive, from the first user device, user input to postpone access to the second content item; and
log, in response to the receiving the user input to postpone access, a credit to an account for the user of the first user device.

* * * * *